(12) United States Patent
Irvin et al.

(10) Patent No.: US 7,399,433 B1
(45) Date of Patent: Jul. 15, 2008

(54) PROCESS FOR PREPARING N-DOPING CONJUGATED ELECTROACTIVE POLYMER USING POLY(3,4 DIFLUOROTHIOPHENE)

(75) Inventors: David J. Irvin, Ridgecrest, CA (US); David L. Witker, Bay City, MI (US); John D. Stenger-Smith, Ridgecrest, CA (US); Jennifer A. Irvin, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 11 days.

(21) Appl. No.: 11/645,259

(22) Filed: Nov. 27, 2006

(51) Int. Cl.
*H01B 1/00* (2006.01)
*H01B 1/12* (2006.01)
*C25D 9/00* (2006.01)
*C08G 61/12* (2006.01)

(52) U.S. Cl. .................... 252/500; 205/317; 205/76; 205/67; 205/334; 204/59 R; 204/73 R; 525/206; 528/373

(58) Field of Classification Search ............... 252/500; 525/206; 205/67, 76, 317, 334; 528/373; 204/59 R, 73 R
See application file for complete search history.

(56) References Cited

U.S. PATENT DOCUMENTS

| 4,933,106 A | * | 6/1990 | Sakai et al. ............... 252/500 |
| 5,328,961 A | * | 7/1994 | Rossi et al. ............... 525/206 |
| 5,514,262 A | * | 5/1996 | Wu et al. .................. 205/317 |
| 5,578,188 A | * | 11/1996 | Mertens et al. ........... 205/334 |

FOREIGN PATENT DOCUMENTS

| JP | 62-181327 | * | 8/1987 |
| JP | 05-059590 | * | 3/1993 |
| JP | 2002-322173 | * | 11/2002 |

OTHER PUBLICATIONS

Shi et al., "A Conducing Polymer Film Stronger Than Aluminum," Science, vol. 267, Feb. 1995, pp. 994-996.*
Groenedaal et al., "Electrochemistry of Poly(3,4-alkylenedioxythiophene) derivatives," Advance Materials, Jun. 2003, pp. 855-879.*

* cited by examiner

*Primary Examiner*—Lorna M. Douyon
*Assistant Examiner*—Khanh Tuan Nguyen
(74) *Attorney, Agent, or Firm*—Brain E. Drazich

(57) ABSTRACT

The present invention demonstrates the synthesis by electropolymerization of a new stable n-doping conjugated polymer poly(3,4-difluorothiophene) that may easily be electrochemically characterized.

5 Claims, 3 Drawing Sheets

US 7,399,433 B1

PROCESS FOR PREPARING N-DOPING CONJUGATED ELECTROACTIVE POLYMER USING POLY(3,4 DIFLUOROTHIOPHENE)

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The present invention relates to processes for preparing poly(3,4-difluorothiophene) via electropolymerization and to methods for using poly(3,4-difluorothiophene).

BACKGROUND OF THE INVENTION

Electroactive polymers can generally be switched between two or more stable oxidation states, giving rise to changes in properties including conductivity, color, volume, and transmissivity. [G. Inzelt, M. Pineri, J. W. Schultze, and M. A. Vorotyntsev, *Electrochim. Acta*, 45, 2403 (2000)]. Electroactive polymers which have been oxidized from a neutral state are said to be p-doped, by analogy to semiconductor terminology. Likewise, polymers that have been reduced from a neutral state are said to be n-doped. Owing to the inherent stability of carbocations, p-dopable materials are quite well known and have been thoroughly documented. [G. Inzelt, M. Pineri, J. W. Schultze, and M. A. Vorotyntsev, *Electrochim. Acta*, 45, 2403 (2000); J. Jagur-Grodzinski, *Polym. Adv. Tech.*, 13, 615 (2002); and, J. W. Schultze and H. Karabulut, *Electrochim. Acta*, 50 1739 (2005)]. One of the most prominent families of p-dopable polymers is that based upon polythiophene. [J. Roncali, *Chem. Rev.* 1992, 92, 711]. However, stable n-doped polymers have heretofore been unreported. [D. M. de Leeuw, M. M. J. Simenon, A. R. Brown, and R. E. F. Einerhand, *Synth. Met.*, 87, 53 (1997); K. Wilbourn and R. W. Murray, *Macromolecules*, 21, 89 (1988); and, M. Quinto, S. A. Jenekhe, and A. J. Bard, *Chem. Mater.* 13, 2824 (2001)]. Such n-doped polymers would be desirable for the same reasons that p-doped polymers have been desired and prepared, as well as for use in applications such as batteries and supercapacitors, for example. [A. Rudge, J. Davey, I. Raistrick, S. Gottesfeld, and J. P. Ferraris, *J. Power Sources*, 47, 89 (1994)]. The instability of n-doping conjugated polymers is most likely due to the inherent instability and highly reactive nature of carbanions as compared to carbocations. [D. M. de Leeuw, M. M. J. Simenon, A. R. Brown, and R. E. F. Einerhand, *Synth. Met.*, 87, 53 (1997)].

One approach being explored to obtain stable n-doping polymers is the synthesis of donor-acceptor materials. [A. Berlin, G. Zotti, S. Zecchin, G. Schiavon, B. Vercelli, and A. Zanelli, *Chem. Mater.*, 16, 3667 (2004); D. J. Irvin, C. J. DuBois, and J. R. Reynolds, *Chem. Comm.* 2121 (1999); P. J. Skabara, I. M. Serebryakov, I. F. Perepichka, N. S. Sariciftci, H. Neugebauer, and A. Cravino, *Macromolecules*, 34, 2232 (2001); and, H—F. Lu, H. S. O. Chan, and S—C. Ng, *Macromolecules*, 36, 1543 (2003)]. In a donor-acceptor type of system, the polymer HOMO (highest occupied molecular orbital) is energetically similar to the relatively high-energy HOMO of the donor material, while the polymer LUMO (lowest unoccupied molecular orbital) is energetically similar to the relatively low-energy LUMO of the acceptor. This type of electronic architecture leads to a small HOMO-LUMO gap in the polymers and consequently to a low-lying polymer LUMO suitable for accepting charge.

The electron-poor functionality of the acceptor groups can be obtained in at least two ways. In the most common approach, electron-withdrawing substituents such as nitro- or fluoro-groups, including perfluorinated alkyl groups, for example, are incorporated pendant to the main chain of the polymer. [D. J. Irvin, C. J. DuBois, and J. R. Reynolds, *Chem. Comm.* 2121 (1999); and, P. J. Skabara, I. M. Serebryakov, I. F. Perepichka, N. S. Sariciftci, H. Neugebauer, and A. Cravino, *Macromolecules*, 34, 2232 (2001)]. While this method can yield electron-deficient monomer units and ultimately electron-deficient polymers, polymers with pendant electron-withdrawing groups often have resonance structures in which the charge is localized on the substituent, thus reducing carrier mobility.

Substituents can be attached to the 3- and 4-positions of the thiophene ring in order to select or to tune the properties of the material. For instance, alkyl chains have been included at the 3-position of the monomer to give the well known poly(3-alkyl thiophene) (P3AT) group [R. S. Loewe, P. C. Ewbank, J. Liu, L. Zhai, R. D. McCullough, *Macromolecules* 2001, 34, 4324-4333; R. S. Loewe, S. M. Kheronsky, R. D. McCullough *Adv. Mater.* 1999, 11, 250-253; and, R. D McCullough and P. C. Ewbank in *Handbook of Conductive Polymers*, (Eds: T. A. Skotheim, R. L. Elsenbaumer, J. R. Reynolds), Marcel Dekker, Inc., New York, 1998, Chap 9]. These polymers are generally soluble in a wide array of organic solvents and generally have oxidation potentials slightly lower than that of unsubstituted polythiophene, owing to the electron-donating effect of the alkyl substituents. In order to further reduce the oxidation potential of polythiophene, stronger electron-donating groups can be attached to the monomer. The most prominent examples of this approach are the poly(alkylene dioxythiophene) or PXDOT materials such as poly(EDOT) and poly(PropOT). [L. Groenedaal, G. Zotti, P. H. Aubert, S. M. Waybright, J. R. Reynolds, Adv. Mater. 2003, 15, 855-XXX; and, J. Roncali, P. Blanchard, P. Fre're, J. Mater. Chem. 2005, 1589]. The strongly electron-donating alkoxy substituents serve to make the polymer much more electron-rich and therefore also more easily oxidized than is unsubstituted polythiophene.

The first and most common of these is the use of alternating electron-rich and electron-poor units in the polymer chain. [C. J. DuBois, K. A. Abboud, J. R. Reynolds *J. Phys. Chem. B* 2004, 108, 8550; D. J. Irvin, C. J. DuBois Jr., J. R. Reynolds, *Chem. Commun.* 1999, 2121; B.-L. Lee T. Yamamoto *Macromolecules* 1999, 32, 1375; C. J. DuBois, J. R. Reynolds, J. R. *Adv. Mater.* 2002, 14, 1844; G. Sonmez, H. B. Sonmez, C. K. F. Shen, R. W. Jost, Y. Rubin, F. Wudl *Macromolecules* 2005, 38, 669; and, A. Berlin, G. Zotti, S. Zecchin, G. Schiavon, B. Vercelli, A. Zanelli *Chem. Mater.* 2004, 16, 3667]. This arrangement provides a low HOMO-LUMO gap in the polymer and consequently a low-lying LUMO suitable for accepting charge. Another approach to producing n-doping materials is the exclusive use of electron-poor monomer units. This objective can be accomplished by attaching electron-withdrawing substituents such as nitro or perfluorinated alkyl groups to the polymer backbone. To be useful in devices such as batteries and supercapacitors, the active materials must exhibit high carrier mobility so that the devices may be discharged rapidly to provide sufficient power for practical applications. In donor-acceptor polymers, the electron-rich portions of the chain serve to reduce carrier mobility as a result of like-charge repulsion.

The present invention discloses the use of a monomer unit analogous to those of the PXDOT families to produce a new n-doping polymer, poly(3,4-difluorothiophene) (PDFT). Whereas the easily oxidized PXDOT materials feature electron-donating substituents in order to enrich the electron density of the polymer backbone, PDFT contains strongly electron-withdrawing fluorine substituents to substantially reduce the electron density of the polymer chain. This makes reduction of the material more likely. In addition, the fluorine substituents do not act as charge traps when the polymer is n-doped because no stabilizing resonance structures are available in this structure.

SUMMARY OF THE INVENTION

The present invention demonstrates a new stable n-doping polymer, poly(3,4-difluorothiophene), which contains strongly electron-withdrawing fluorine substituents to substantially reduce the electron density of the polymer chain.

DETAILED DESCRIPTION OF THE INVENTION

Figure 1:
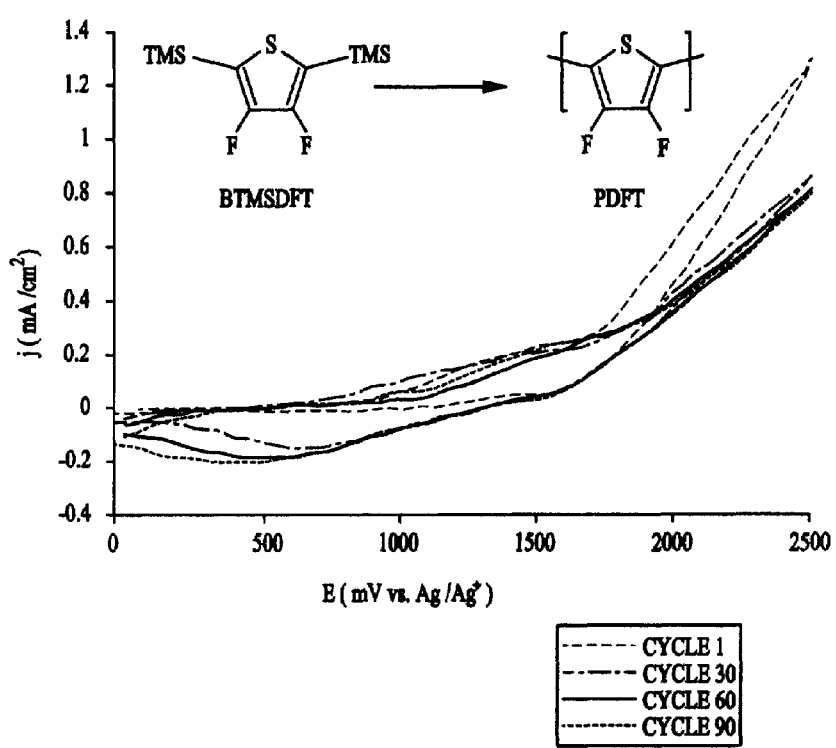
FIG. 1 is a diagram of Voltammograms showing slow film growth from a 50 mM solution of BTMSDFT in neat $BF_3 \times Et_2O$ where no monomer re-neutralization can be observed.

The monomer used to produce poly(3,4-difluorothiophene), 2,5-bis(trimethylsilyl)-3,4-difluorothiophene (BTMSDFT), was synthesized using a published procedure. [Y. Sakamoto, S. Komatsu, T. Suzuki, *J. Am. Chem. Soc.* 2001, 123, 4643]. After protection of the 2- and 5-positions of 3,4-dibromothiophene with trimethylsilyl groups, repeated lithiations and fluorinations with $(PhSO_2)_2NF$ gave the desired product in good yield. This approach allows for fairly large quantities of the monomer to be obtained. It was found that BTMSDFT would electropolymerize in a similar fashion to 2,5-unsubstituted thiophene derivatives, as would be expected since trimethylsilyl (TMS) is a good cationic leaving group, [L. Groenedaal, G. Zotti, P. H. Aubert, S. M. Waybright, J. R. Reynolds, *Adv. Mater.* 2003, 15, 855-XXX].

While most thiophene-based monomers are easily anodically polymerizable, the electron-poor nature of BTMSDFT makes oxidation of this material more difficult. Indeed, efforts to electropolymerize BTMSDFT with traditional electrolytes and solvents such as tetraalkylammonium tetrafluoroborate and either acetonitrile or propylene carbonate were completely unsuccessful. In these electrolyte/solvent systems, it is likely that the monomer oxidation potential is greater than that of the solvent itself. When the applied potential is increased to very positive values, the solvent begins to degrade while the monomer is unaffected. This is in accord with the observation that even after extended cycling periods, there was no evidence of polymerization in the voltammograms generated and no film could be observed upon the electrode surface.

Several methods to lower the oxidation potential of monomers for electropolymerization have been reported. The first of these is the use of strong Lewis acids such as $AlCl_3$ or $BF_3.Et_2O$ as the electrolyte. [G. Shi, S. Jin, C. Li, *Science* 1995, 267, 994; and, S. Alkan, C. A. Cutler, J. R. Reynolds, *Adv. Funct. Mater.* 2003, 13, 331]. It is believed that the acids interact with the X system of the aromatic unit, thus reducing the resonance energy of the monomer's aromatic system and ultimately lowering the oxidation potential of the monomer. In addition to the use of acidic electrolyte, increasing the monomer concentration in the polymerization medium has been shown to lower the oxidation potential of various thiophene-based monomers considerably. [L. Zhou, S. Jin, G. Xue, *Macromol. Chem. Phys.* 1996, 197, 3309; and, D. Zhang, J. Qui, G. Xue, *Synth. Met.* 1999, 100, 285].

EXPERIMENTAL

All electrochemical experiments were performed in a nitrogen atmosphere drybox using a PARSTAT model 2237 potentiostat. BTMSDFT was synthesized according to the procedure of Sakamoto et al. previously reported above. $BF_3.Et_2O$ was purchased from Aldrich in a Sure-Seal bottle and used as received. Aluminum chloride was purchased from Aldrich and used as received. Propylene carbonate was dried by distillation from calcium oxide. Acetonitrile was dried by distillation from calcium hydride. Tetramethylammonium tetrafluoroborate ($TMABF_4$) was recrystallized twice from methanol/water. The electrolyte was then dried in a vacuum oven at 110° C. for twenty-four hours before use. Successful electropolymerizations were conducted using a 50 mM solution of BTMSDFT in neat $BF_3.Et_2O$ and scanning the applied potential between 0 and 2500 mV at a scan rate of 62.5 mV/s through ninety cycles. The working, auxiliary, and reference electrodes were a platinum button (area=0.02 cm$^2$), a platinum flag, and a non-aqueous Ag/Ag$^+$ reference electrode, respectively. The potential of this electrode was calibrated using the ferrocene/ferrocinium couple. The reduction potential of the couple was found to be 97 mV vs. the reference electrode. All potentials quoted here are relative to the Ag/Ag$^+$ reference electrode. Cycling of the polymer films was accomplished using monomer-free 100 mM $TMABF_4$ in propylene carbonate as the electrolyte system.

Example 1

Synthesis of PDFT Films

Initially, the electropolymerization media used was a 10 mM solution of BTMSDFT in 3 M $AlCl_3$/acetonitrile. After cycling the applied potential between 0 and 2500 mV at 30 mV/s for two hours, no evidence of polymerization could be observed either in the voltammograms or by visual inspection of the electrode surface. According to published reports, boron trifluoride-diethyl ether complex ($BF_3.Et_2O$) is slightly more effective than is $AlCl_3$ at lowering the oxidation potential of unsubstituted thiophene for purposes of electropolymerization. Next, a 10 mM solution of BTMSDFT in neat $BF_3.Et_2O$ was prepared and the applied potential was cycled between 0 and 2500 mV at about 62.5 mV/s for two hours (90 cycles). Again, even after this extended cycling time, no evidence of polymerization could be observed either in the voltammograms or by visual inspection of the electrode surface. Therefore, the concentration of the monomer solution was then increased to 50 mM BTMSDFT in neat $BF_3.Et_2O$ and the experiment was repeated. At this relatively high monomer concentration, gradual film growth was observed in the voltammograms (FIG. 1) and after completion of scanning, a red film was present on the button electrode. The Voltammograms (FIG. 1) show slow film growth from a 50 mM solution of BTMSDFT in neat $BF_3 \times ET_2O$. No monomer re-neutralization can be observed.

As evidenced by the voltammograms generated during electropolymerization, the growth of the polymer film proceeds relatively slowly. In contrast, it is often possible to produce films of P3AT's and PXDOT's with redox current responses on the order of 1 mA/cm$^2$ in a matter of seconds. It has been hypothesized that some monomers undergo slow anodic polymerization due to monomer re-neutralization during potential cycling. That is, the monomer can be oxidized, but the resulting radical cation may have a preferred resonance form that is not amenable to coupling. When the potential is scanned toward more negative values, the radical cation is reduced to its neutral state without coupling. Hence, only a small fraction of the oxidized monomer is incorporated into the polymer film on each scan. However, such monomer re-neutralization is not the explanation for the slow growth of the PDFT film as no discernable monomer reduction is present in the voltammograms generated during deposition of PDFT. Rather, the slow growth rate of the PDFT film is most likely a result of the intrinsic highly electron deficient nature of the monomer. The failure of the 10 mM BTMSDFT/3 M $AlCl_3$/acetonitrile and 10 mM BTMSDFT/$BF_3.Et_2O$ experiments to yield a polymer film suggests that the 50 mM BTMSDFT/$BF_3.Et_2O$ electropolymerization system is barely able to reach the threshold of monomer oxidation before degradation of the medium itself occurs. Thus, during potential cycling of 50 mM BTMSDFT/$BF_3.Et_2O$, only a small amount of monomer is oxidized on each scan and only a very small amount of polymer is deposited resulting in the slow growth rate observed.

Example 2

Electrochemical Characterization of PDFI Film

Figure 2:
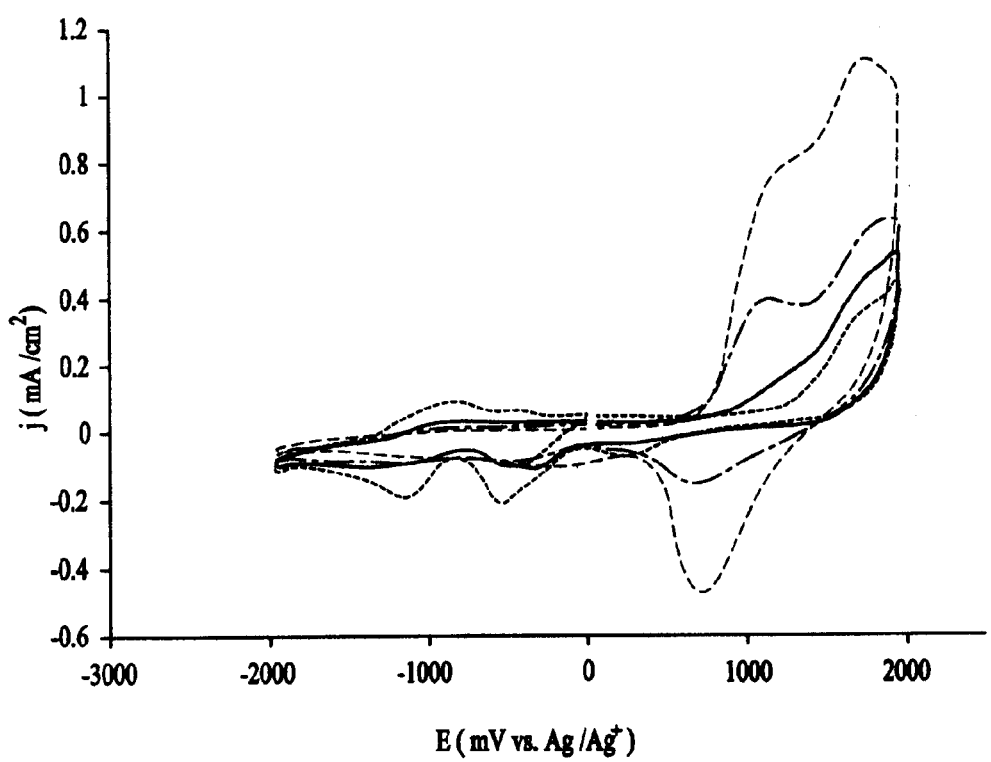
FIG. 2 is a diagram of repeated cycling of a PDFT film in monomer-free 100 mM $TMABF_4$/propylene carbonate. Emergence of n-doping responses and a p-doping couple with a large peak separation accompany the loss of the initial prominent p-doping couple.

After the PDFT film was obtained, it was then cycled in monomer-free electrolyte solution in order to observe its doping behavior. The voltammograms generated during these experiments are shown in FIG. 2 for repeated cycling of a PDFT film in monomer-free 100 mM $TMABF_4$/propylene carbonate. Initially, a prominent redox couple corresponding to polymer oxidation is observed. During the first few scans, there is very little evidence of any n-doping behavior whatsoever. However, as the film is repeatedly cycled, the p-doping signal centered at roughly 1000 mV gradually diminishes in intensity until it is no longer visible. At the same time, reductions at more negative potentials gradually strengthen before finally stabilizing. Also, in the course of repeated cycling, the current response centered at about 250 mV becomes more intense as the signals corresponding to p-doping diminish and those representing n-doping emerge. Emergence of n-doping responses and a p-doping couple with a large peak separation accompany the loss of the initial prominent p-doping couple.

Figure 3:
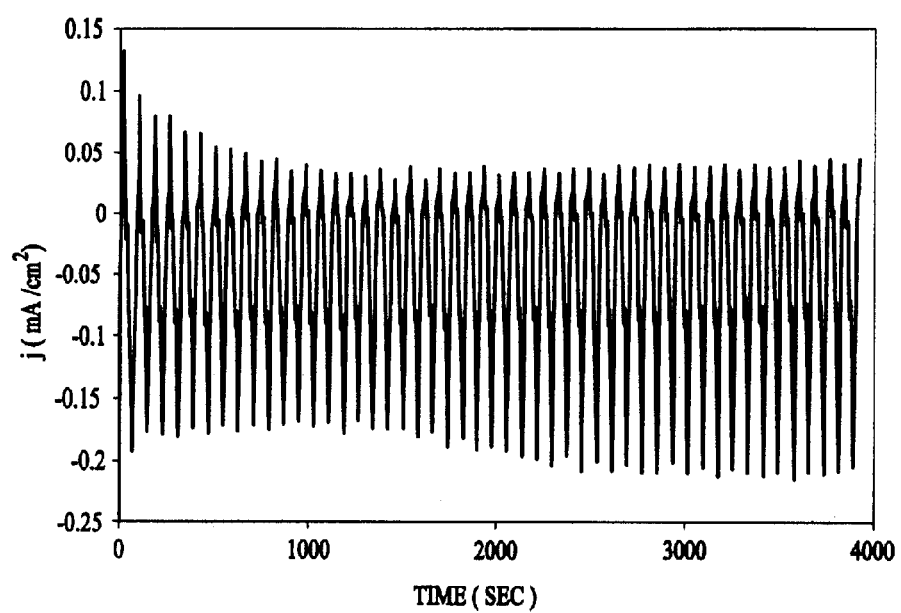
FIG. 3 is a diagram of Current vs. Time plots of 50 scans of a PDFT film at 50 mV/s from −2 to 0 V vs. Ag/Ag$^+$ where the n-doping response stabilizes and the p-doping current diminishes.

As the PDFT film was cycled throughout the wide potential range (−2000 mV to +2000 mV), several cycles were necessary for n-doping signals to become prominent. This result suggests that with each successive cycle, cations are able to penetrate more completely into the polymer film. In addition, residual $BF_3 \times Et_2O$ is being removed from the film, thus allowing for the increase in n-doping activity. Eventually, the growth of the n-doping responses slows (FIG. 3), suggesting that the polymer is approaching its n-doping limit. In cycling the film from 0 to −2000 mV vs. Ag/$Ag^+$, a stabilization of the n-doping processes and a reduction of the p-doping current occurs as is shown in FIG. 3 plot of Current vs. Time of 50 scans of a PDFT film at 50 mV/s from −2 to 0 V vs. Ag/$Ag^+$.

Discussion of Examples and Results

A new polymer consisting of electron-deficient 3,4-difluorothiophene repeat units has been synthesized by anodic polymerization. Because of the extremely electron-poor nature of the monomer, electrodeposition could only be accomplished with the strong Lewis acid $BF_3.Et_2O$ as the polymerization medium and a relatively high monomer concentration of 50 mM. It is likely that the slow rate of film growth is attributable to the low electron density of the monomer and not to production of unreactive radical cations upon oxidation. The films obtained were cycled in monomer-free 100 mM $TMABF_4$/propylene carbonate, initially showing a prominent p-doping current response with nearly no evidence of n-doping behavior. As cycling continued, n-doping signals gradually emerged along with the disappearance of the large p-doping signal. After repeated cycling, the polymer oxidation was characterized by a redox couple with peak separation of greater than 1000 mV. This change in voltammetry can best be explained by considering the ion migration effects at work during the doping/dedoping processes. It is likely that the establishment of cation channels interferes in some way with the migration of anions, thus making polymer oxidation more difficult. The electrochemical behavior of the polymer, PDFT, establishes it as a new stable n-dopable conjugated polymer.

While the present invention has been described in connection with what are currently considered to be the most practical and preferred embodiments, it is to be understood that the invention is not to be limited to the disclosed embodiments, but to the contrary, is intended to cover various modifications, embodiments, and equivalent processes included within the spirit of the invention as may be suggested by the teachings herein, which are set forth in the appended claims, and which scope is to be accorded the broadest interpretation so as to encompass all such modifications, embodiments, and equivalent processes.

What is claimed is:

1. A process for preparing a stable n-doping conjugated electroactive polymer comprising:
    providing a solution containing monomeric 2,5-bis(trimethylsilyl)-3,4-difluorothiophene in boron trifluoride-diethyl ether complex electrolyte;
    contacting a platinum substrate with said solution;
    selecting a first electrical potential where said 2,5-bis(trimethylsilyl)-3,4-difluorothiophene is in a reduced state and a second electrical potential necessary to oxidize said 2,5-bis(trimethylsilyl)-3,4-difluorothiophene;
    applying an electrical potential to said platinum substrate in contact with said solution;
    cycling said electrical potential at a predetermined rate of change between said selected first electrical potential and said selected second electrical potential to effect electrodeposition of poly(3,4-difluorothiophene) on said platinum substrate;
    growing a film of stable n-doping poly(3,4-difluorothiophene) of a desired thickness on said platinum substrate by cycling said electrical potential for a predetermined time.

2. The process of claim 1 wherein said selected first electrical potential and said selected second electrical potential are about 0 mV and 2500 mV, respectively, with respect to a neutral reference.

3. The process of claim 1 wherein an acidic electrolyte at least as strong as boron trifluoride-diethyl ether complex is substituted for said boron trifluoride-diethyl ether complex.

4. The process of claim 3 wherein said acidic electrolyte is a Lewis acid.

5. The process of claim 3 wherein said acidic electrolyte is a peroxy acid.

* * * * *